Dec. 29, 1931.  F. J. O'BRIEN  1,838,439
CASING SLIP
Filed Jan. 28, 1930
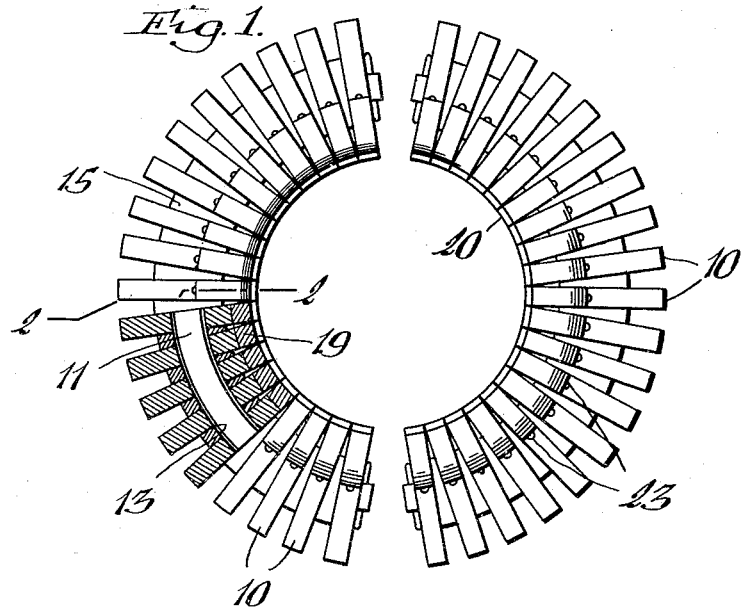
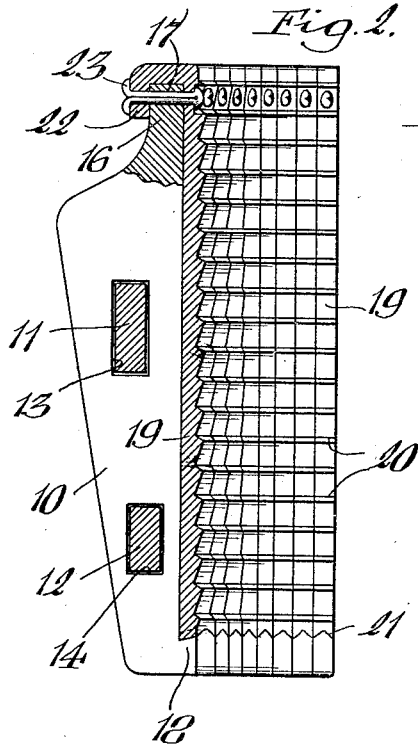 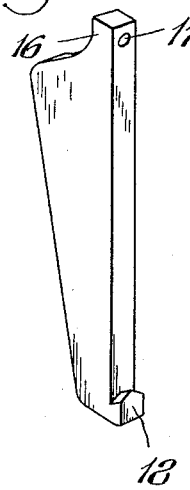 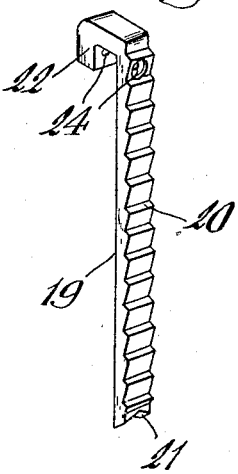
Inventor,
Frederick J. O'Brien,
by Walter P. Geyer
Attorney.

Patented Dec. 29, 1931

1,838,439

UNITED STATES PATENT OFFICE

FREDERICK J. O'BRIEN, OF TITUSVILLE, PENNSYLVANIA, ASSIGNOR TO STRUTHERS WELLS-TITUSVILLE CORPORATION, OF TITUSVILLE, PENNSYLVANIA, A CORPORATION OF MARYLAND

CASING SLIP

Application filed January 28, 1930. Serial No. 424,090.

This invention relates to improvements in the casing slips or pipe-gripping devices employed for supporting the drill pipes of rotary drilling apparatus.

One of its objects is to provide a casing slip of this character whose gripping or toothed faces are readily replaceable from the slip bodies, thereby affording a material saving in the maintenance cost of these devices.

Another object of the invention is the provision of effective and reliable means applied to the slip body and its liner for readily and positively securing the liner in place against relative displacement to the body.

In the accompanying drawings:—

Figure 1 is a top plan view, partly in section, of a slip structure embodying my invention.

Figure 2 is an enlarged transverse section thereof taken in the plane of line 2—2, Figure 1.

Figures 3 and 4 are perspective views of one of the slip bodies and its replaceable liner, respectively.

Similar characters of reference indicate corresponding parts throughout the several views.

In the embodiment of my invention depicted in the drawings, the casing slip is composed of a plurality of slip units adapted for engagement with the tapered opening of the customary table or spider bushing (not shown), the pipe or casing extending through these slip units and suspended from them in the usual manner. Each of these slip units consists of a plurality of radially disposed plates 10, preferably rectangular in cross section and supported on upper and lower semicircular rings 11 and 12, respectively, said plates having corresponding ring-receiving openings 13, 14 which are of a size to readily receive the plates and allow them sufficient freedom of movement to enable the slip units to firmly grip the pipe about its entire circumference. The radial arrangement of the plates is maintained by wedge-shaped spacer plates 15 tapering from their outer to their inner edges and supported between adjoining slip-plates on the upper ring 11.

Each slip-plate 10 is provided at its upper end in contiguous relation to the inner edge thereof with an upwardly facing lug or projection 16 having an opening 17 therein. At their lower ends each plate has an inwardly facing lug or projection 18 having an inverted, substantially V-shaped upper edge which is undercut or beveled downwardly toward the inner edge of the plate, as shown in Figures 2 and 3, to form a seat or shoulder for supporting the replaceable liner 19 having teeth or wickers 20 on its inner or gripping edge. The lower end of the liner has an inverted, substantially V-shaped notch 21 which is adapted to engage the corresponding lug 18 on the slip-plate so as to hold the lower end of the liner against displacement relative to the plate. At its upper end the liner 19 terminates in an outwardly and downwardly bent hook or clamp 22 which is adapted to engage the plate lug 16 in the manner shown in Figure 2. A cotter pin 23, engaging the lug-opening 17 and alining openings 24 in the liner and its depending hook 22 serves to detachably anchor the liner to the plate and hold its upper end against displacement relative thereto.

In applying a liner to its slip-plate, the same is preferably slipped over the slip-plate with a downward movement to bring its lower end with interlocking engagement with the lug 18 and its upper end into engagement with the lug 16 on the slip-plate, after which the cotter pin 23 is inserted in place. The removal of the liner is just as quickly accomplished by removing the cotter pin and lifting the liner from the slip-plate.

This improved slip structure is manifestly simple, compact and inexpensive in construction, and its liners may be readily applied and removed in the field of operations without the use of tools.

I claim as my invention:—

1. A casing slip of the character described, comprising a body, a liner having pipe-gripping means on its inner face, means on said body for supporting one end of said liner against both downward and lateral displacement, and means formed integrally at the opposite end of said liner for detachably connecting it to said body.

2. A casing slip of the character described, comprising a body having a shoulder projecting from the lower end of its inner face, a liner having pipe-gripping means on its inner face and seated at its lower end on said shoulder, the lower end of the liner and said shoulder being shaped to prevent lateral displacement of said liner, and means carried by the upper end of said liner for detachably connecting it to said body, whereby the liner is held against both vertical and transverse displacement relative to the body.

3. A casing slip of the character described, comprising a body having a shoulder projecting from the lower end of its inner face, said shoulder sloping downwardly from its outer edge and its top face being deflected laterally in opposite directions, a liner applied to said body and having a notch at its lower end corresponding in shape to the top face of said shoulder and engageable therewith, and means for securing the upper end of said liner to the slip-body.

4. A casing slip of the character described, comprising a body having an upwardly-facing shoulder adjacent its lower end and an upstanding lug at its upper end, said shoulder being undercut and its top face being substantially V-shaped, a liner applied to said body and having its lower edge beveled and provided with a substantially V-shaped notch engageable with said body-shoulder, and means for detachably connecting the upper end of the liner to said body-lug.

5. A liner for casing slips, comprising a flat, bar-like member having pipe-gripping means on its inner edge and terminating at its upper end in a hook-shaped attaching element for securing it to a slip.

6. A liner for casing slips, comprising a flat, bar-like member having pipe-engaging means on its inner face, the lower edge of said member having a notch therein and its upper end terminating in a suspension hook.

7. A liner for casing slips, comprising a member having pipe-engaging means on its inner face, the lower edge of said member being inclined downwardly and outwardly and having a substantially V-shaped notch therein, and an outwardly and downwardly bent attaching element formed at the upper end of said member.

FREDERICK J. O'BRIEN.